US009996495B2

United States Patent
Feldman et al.

(10) Patent No.: US 9,996,495 B2
(45) Date of Patent: Jun. 12, 2018

(54) ADVANCED PCI EXPRESS BOARD ASSEMBLY

(71) Applicants: Michael Feldman, Thornhill (CA); Boris Feldman, Thornhill (CA)

(72) Inventors: Michael Feldman, Thornhill (CA); Boris Feldman, Thornhill (CA)

( * ) Notice: Subject to any disclaimer, the term of this patent is extended or adjusted under 35 U.S.C. 154(b) by 380 days.

(21) Appl. No.: 14/683,147

(22) Filed: Apr. 10, 2015

(65) Prior Publication Data
US 2016/0299863 A1 Oct. 13, 2016

(51) Int. Cl.
*G06F 13/40* (2006.01)
*G06F 13/362* (2006.01)
*G06F 13/42* (2006.01)

(52) U.S. Cl.
CPC .......... *G06F 13/409* (2013.01); *G06F 13/362* (2013.01); *G06F 13/4022* (2013.01); *G06F 13/4068* (2013.01); *G06F 13/4282* (2013.01)

(58) Field of Classification Search
CPC .... G06F 13/4068; G06F 13/609; G06F 1/184; G06F 1/185; G06F 13/409; G06F 13/4022; G06F 21/85
See application file for complete search history.

(56) References Cited

U.S. PATENT DOCUMENTS

| | | | |
|---|---|---|---|
| 6,356,959 B1* | 3/2002 | Thomas | G06F 1/184 710/2 |
| 2014/0129753 A1* | 5/2014 | Schuette | G06F 13/4068 710/301 |
| 2016/0073544 A1* | 3/2016 | Heyd | G11B 33/128 361/679.31 |

* cited by examiner

*Primary Examiner* — Ernest Unelus
(74) *Attorney, Agent, or Firm* — Bereskin & Parr LLP/S.E.N.C.R.L., s.r.l.

(57) ABSTRACT

An advanced PCI Express board assembly is intended for efficiently placing more electronic components or modules having a large height (up to 8.57 mm) in comparison with traditional PCI Express add-in boards. This assembly comprises two PCBs connected together. The first one has the minimum possible sizes. This PCB includes a PCI Express male edge connector and is intended to be plugged in to motherboard female PCI Express connector. The second PCB is parallel to first one and is located in the middle of the space (slot) defined for one add-in PCI Express board. This position makes possible to place high electronic components or modules on the both sides (top and bottom) of the second PCB.

19 Claims, 4 Drawing Sheets

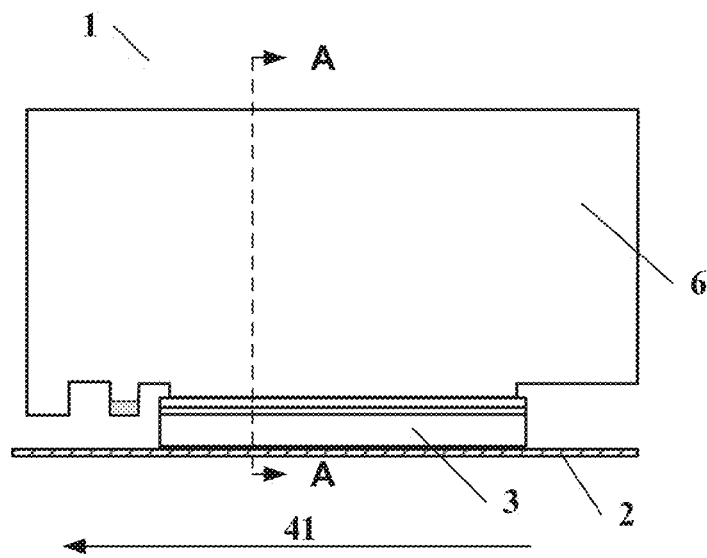
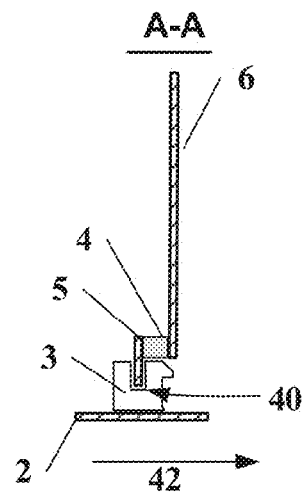
FIG. 1A  FIG. 1B
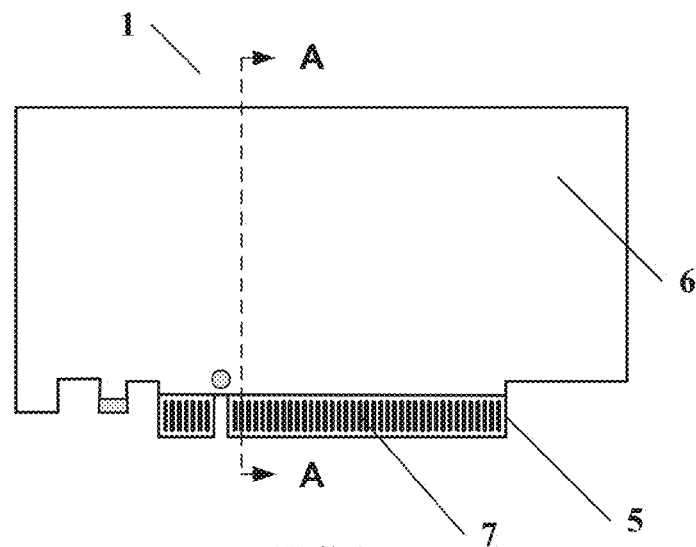
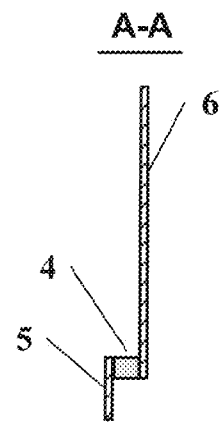
FIG. 2A  FIG. 2B

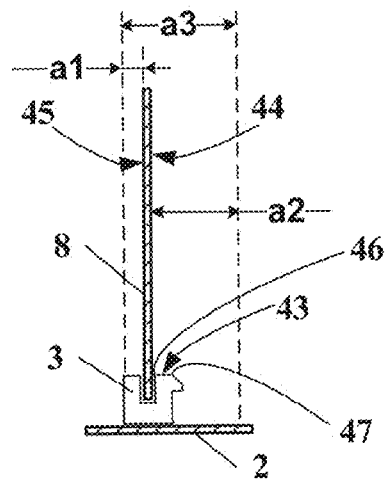
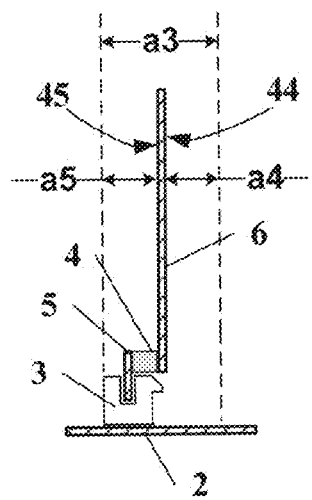
FIG. 3A    FIG. 3B
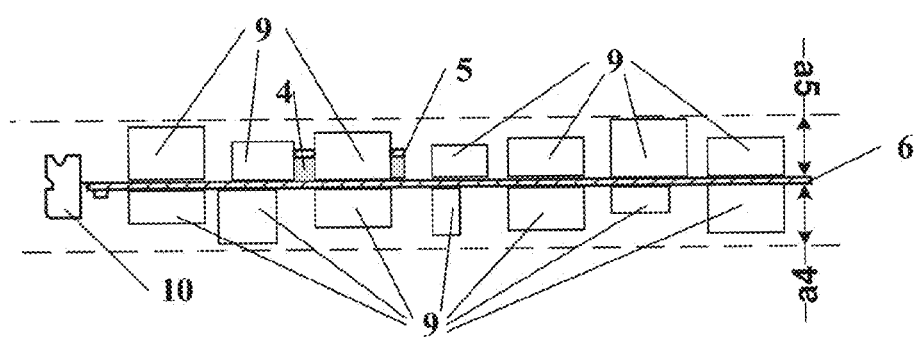
FIG. 4

ADVANCED PCI EXPRESS BOARD ASSEMBLY

CROSS-REFERENCE TO RELATED APPLICATION

This is the first application filed for the present invention.

TECHNICAL FIELD

The present invention relates to the field of high-performance computer technology and, in particular, to add-in PCI Express Boards intended for a compact arrangement of large numbers of high electronic components or modules.

BACKGROUND

Today there is a class of PCI Express boards that are dedicated for the multichannel wireless communication market. The main feature of these boards is that these boards use different wireless modules or blocks located on the PCB surface. Most of these wireless modules are implemented in a MiniPCI Express or M.2 form factor.

The wireless module itself or wireless modules in MiniPCI Express or M.2 form factor are significantly higher than standard electronic components that can be placed on the PCI Express board PCB.

The PCI Express add-in board specification limits the height of the components that can be placed on each side of the PCB. The maximum height of components on the primary component side (top side) of a PCI Express add-in card can't exceed 14.47 mm, and the maximum height of components on the bottom side (also referred to as the soldering side) of the PCI Express add-in card can't exceed 2.67 mm (according to the PCI Express Specification). These requirements essentially limit the possibility of using the bottom side of the PCI Express board for high electronic components or wireless modules placement.

The development road map of modern personal computers (motherboards) is moving towards reducing the quantity of PCI Express sockets for connecting add-in PCI Express boards. The most popular motherboards have one or two ×16 PCI Express connectors. As the result the number of add-in PCI Express boards that can be connected to the motherboard decreases.

Therefore, efficiency of PCI Express board surface utilization and increasing the number of electronic components or electronic modules on the PCI Express board are becoming top priorities.

The well-known way to increase the number of electronic components or electronic modules on the PCI Express add-in board is using so-called daughter boards that mechanically and electrically are connected to the PCI Express add-in board. These daughter boards are located in parallel to the add-in PCI Express boards and mount on the top side of them.

US Pat. Application 20140365714 (P. Sweere, et al) represented an additional daughter-card (PCB), on which additional electronic components are located. Said daughter PCB is located in parallel to the add-in PCI Express board. The total height of the components that are located on the top surface of the PCI Express add-in board together with daughter board components and the thickness of a printed board of said daughter board can't exceed the value of 14.47 mm that is defined by PCI Express Specification. The daughter board is connected to main add-in PCI Express board via "a flash daughter-card connector".

U.S. Pat. No. 8,639,863 (P. Kanapathippillai, et al.) proposed to use multiple daughter boards located on the top side of the PCI Express add-in board in two layers. The total height of the components from the top side surface of the PCI Express add-in board including the daughter board components and daughter board PCB thickness can't exceed the value of 14.47 mm. Therefore, the height of components located between the top side surface of the PCI Express add-in board and the bottom side surface of the daughter board and height of the components on the top side surface of the daughter board are significantly limited.

Solutions with daughter boards have four main disadvantages. First, air flow between daughter boards and PCI Express add-in board is limited, and the placement of electrical components that can generate significant amounts of heat between the daughter board and PCI Express add-in board (top side) is not possible.

Second, the traditional PCI Express add-in board with a daughter board on the top side can't utilize the 2.67 mm space on the bottom side of the PCI Express add-in board for high electronic components or modules placement (like transformers, relays, capacitors etc.).

Third disadvantage is that by using any additional daughter boards the maximum height of electronic components that can be located on the top side of the PCI Express board is reduced by the value equal to the daughter board thickness. And the resulting maximum height is divided by daughter board. That makes it practically impossible to install electronic components with a height of more than 4 mm.

Fourth disadvantage is that all known standard solutions with daughter boards cannot be used for the placement of multiple replaceable modules (for example wireless modules in MiniPCI Express or M.2 form factor that can have height more than 6 mm). Even if the modules are placed between the daughter board and PCI Express add-in board, they are then not accessible for replacement.

BRIEF SUMMARY OF THE INVENTION

The first aspect of the present invention consists in that the offered Advanced PCI Express board assembly allows significantly increasing the number of high electronic components or modules of height up to 8.57 mm compared to traditional PCI Express add-in boards.

The next aspect of the present invention consists in that the proposed assembly allows placing large electronic components or modules on the both sides of the PCB, that is located in the middle of the maximum space that PCI Express specification reserves for one-slot PCI Express add-in boards.

The third aspect of the present invention consists in that the offered assembly increases an efficiency of air flow cooling by allowing high components or modules to be placed on both sides (top and bottom) of the PCB.

The fourth aspect of the present invention consists in that said assembly provides a wide opportunity of using exchangeable male edge PCI Express connectors corresponding to ×1, ×2, ×4, ×8 or ×16 lanes. This architecture allows plugging the proposed PCI Express assembly into different motherboard female PCI Express connectors.

The next aspect consists in that there is no restriction on the thickness of the PCB on which high components are placed, because this PCB is not intended to be plugged into a PCI Express female connector. The thickness of this PCB can be increased to prevent PCB twisting because of the PCB length and heavy component installation.

BRIEF DESCRIPTION OF THE DRAWING

FIGS. 1A-1B show the proposed Advanced PCI Express board assembly inserted in to a motherboard PCI Express female connector; FIG. 1A represents a top side view of said assembly; FIG. 1B represents a sectional view executed along line A-A of said advanced PCI Express board assembly.

FIGS. 2A-2B show the proposed Advanced PCI Express board assembly; FIG. 2A represents a top side view of said assembly; FIG. 2B represents a sectional view executed along line A-A of said advanced PCI Express board assembly shown on FIG. 2A.

FIG. 3A shows a cross view of a traditional add-in PCI Express board with restricted height of components based on the PCI Express Specification.

FIG. 3B shows a cross view of the proposed Advanced PCI Express board assembly with restricted height of components based on the PCI Express Specification.

FIG. 4 shows the proposed Advanced PCI Express board assembly together with components installed on the both sides of the Main board.

DETAIL DESCRIPTION OF THE INVENTION

Figure 5A:
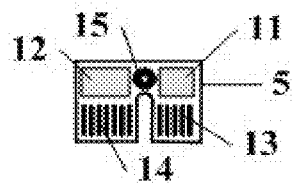
FIGS. 5A-5C show examples of the Adapter board together with means for mechanical and electrical connection to the Main board.

FIG. 1A represents a view of the proposed Advanced PCI Express board assembly 1 inserted into a female PCI Express connector 3 that is located on a computer system board 2, for example, a motherboard. The female PCI express connector 3 has a receiving portion 40 defining a centerline that extends in a longitudinal direction 41. The proposed Advanced PCI Express board assembly (FIG. 1B) consists of the Main board 6, the Adapter board 5 and means for electrical and mechanical connection 4 of said Main board 6 and Adapter board 5. One or more connectors can be used for electrical connection of said Adapter board 5 and Main board 6. Spacers can be used for additional mechanical stabilization. The spacers can be fixed on the Adapter board 5 and/or Main board 6 via solder, glue, screws etc. The connection between said Adapter board and said Main board can be permanent when there is no possibility to disconnect both boards after assembly or, on the contrary, both boards can be disconnected after assembly.

In general, the PCI Express board assembly 1 is compliant with the PCI Express Specification and intended for use in a computerized system. The computerized system can include a motherboard with at least one PCI Express slot and a female PCI Express connector mounted on the motherboard inside the PCI express slot. The assembly can include an Adapter board 5, a Main board 6, and connectors for attaching and electrically connecting the Adapter board 5 and Main board 6. The connectors can be positioned between the Adapter board 5 and Main board 6. The connectors (e.g. stackable connectors, mechanical spacers, screws, clamps, spacers and/or any combinations of such connectors) can mechanically attach and keep the Adapter board 5 and Main board 6 in parallel and at a predetermined distance apart in a lateral direction 42. For example, the Adapter board 5 and Main board 5 may be maintained at a predetermined distance of about 4.3 mm in cases where the thickness of the Main board 6 is about 1.57 mm (e.g. as shown in FIG. 3B). The predetermined distance can be selected based on the desired application of the PCI express board assembly 1. The connectors also include signal connectors that provide an electrical connection between the Main Board 6 and the motherboard 2 via the Adapter board 5. The signal connectors enable transmission of all necessary electrical communication signals between the Main board 6 and the motherboard 2, including signals from the PCI Express upstream port. The signal connectors can include one or more connectors, traces or wires. In some cases, the signal connectors may also be used to mechanically attach the adapter board 5 and main board 6.

The Adapter Board 5 includes a male edge PCI Express connector. The male edge PCI Express connector can be used to mount the Adapter Board 5 to the female PCI express connector 3 on the motherboard 2. The Main board 6 includes a PCI Express interface circuit including a PCI express upstream port. The PCI express upstream port can be electrically coupled directly to the male edge PCI Express connector on the Adapter Board 5.

In the proposed assembly, the Main board 6 and Adapter board 5 can occupy a region that complies with the PCI Express specification for a one slot add-in PCI Express board (i.e. the occupied region is not greater than the maximum space for a one slot add-in PCI Express board). The Adapter board 5 and Main board 6 can be retained at a predetermined distance chosen to provide an approximately equal space for components that can be installed on the top (or component) side 44 and bottom (or soldering) side 45 of the Main board 6 (e.g. as shown in FIG. 3B). Other predetermined distances may be chosen depending on the application of the PCI express board assembly 1.

FIG. 2A represents a top side view of the Advanced PCI Express board assembly with the male edge PCI Express connector 7 located on the Adapter board 5. Said male edge PCI Express connector 7 is intended for connecting to the PCI Express interface connector 3 of the motherboard 2. FIG. 2B shows a sectional view of the Advanced PCI Express board assembly shown in FIG. 2A along line A-A shown in FIG. 2A.

FIG. 3A shows a cross-sectional view of a traditional PCI Express board 8 inserted into a female PCI Express connector 3 that is located on the motherboard 2. FIG. 3A shows the height restriction for components that are located on the top 44 and bottom sides 45 of the PCB 8. The value a1 shows the maximum height of components on the bottom side 45 of the PCB as defined by PCI Express specification, and it is equal to 2.67 mm in FIG. 3A. The value a2 shows the maximum height of components on the top side 44 of the PCB as defined by PCI Express specification, and it is equal to 14.47 mm. The value a3 represents the size of the space reserved for a one-slot PCI Express add-in board by the PCI Express specification, and it is equal to 18.71 mm. The female PCI express connector 3 has a top side upper surface 43 that extends in the lateral direction 42 from a first top side edge 46 adjacent the receiving portion 40 to a second top side edge 47 over a first distance.

As mentioned, the Adapter board 5 and Main board 6 can be maintained at a predetermined distance apart in the lateral direction 42. As shown in FIG. 3B, the main board 6 can be offset from the receiving portion 40 in the lateral direction 42 by a second distance that is greater than the first distance over which the top side upper surface 43 of the female PCI express connector 3 extends.

FIG. 3B shows a cross-sectional view of the proposed Advanced PCI Express board assembly of FIG. 1B. A value a4 shows the maximum height of components on the top side 44 of the Main board 6 when the Main board 6 is located in the middle of the space that is reserved for one-slot PCI Express add-in board by the PCI Express specification. A value a5 shows the maximum height of components on the bottom side 45 of the Main board 6. The values of a5 and a4 are equal to 8.57 mm (in case the thickness of the Main board 6 is 1.57 mm). Most electronic components like transformers, capacitors, ICs with heat sinks, relays, modules etc. have height less than 8.57 mm but higher than 4 mm. These components can be assembled on the top 44 and bottom 45 sides of the Main board 6 without violation of PCI Express specification. In actual practice said values a4=d±b and a5=d−(±b), where d=8.57 mm and b is several times smaller than d. Where said value "b" is chosen based on the actual size of used components and structural elements.

In some examples, the Main Board 6 and the Adapter Board 5 can be rigidly connected by the mechanical connectors as described below. The Main Board 6 can be secured approximately in the middle of a PCI Express slot which corresponds to the maximum a3 space defined by PCI Express specification for a one slot add-in PCI Express board.

In some cases, the mechanical connectors between the Main Board 6 and the Adapter board 5 can include fixed connectors, e.g. attached to the Main Board 6 and/or Adapter board 5 by glue or solder. In other cases, the Main board 6 and Adapter board 5 may be detachably attached. For example, the Main board 6 and Adapter board 5 may be detachably attached using one or more of a stackable connector, a mechanical spacer, a screw, a clamp, a spacer and/or any combinations of such connectors, spacers, screws, clamps etc.

FIG. 4 shows a top view of the proposed Advanced PCI Express board assembly together with components 9 assembled on both sides (top 44 and bottom 45) of the Main board 6. The area of the Adapter board 5 has to be as small as possible to maximize efficiency in the placement of the high components 9. In FIG. 4, the Adapter board 5 has said male edge PCI Express connector 7 (FIG. 2A) and means for electrical and mechanical connection 4 to Main board 6. Values a4 and a5 are shown on the FIG. 4.

In FIG. 4 a PCI Express bracket 10 is shown that is installed on the Main board 6. The PCI Express bracket 10 can be mounted on the Main board 6 via tabs located in the middle of said bracket. PCI Express bracket can be mounted on the IO connectors located on the front edge of the Main board 6 as well (not shown).

The assembly can include a bracket 10 fastened to one or both of the Main Board 6 and the Adapter Board 5. The bracket 10 can be used for mechanically stabilizing the assembly inside the PCI Express slot. In some examples, the bracket 10 can be fastened to the Main Board 6 directly, e.g. using one or more bracket tabs. In some examples, the bracket 10 can be fastened to one or more edge mounted input/output connectors located on the front edge of the Main Board 6.

Figure 5B:
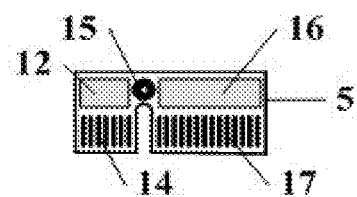
Figure 5C:
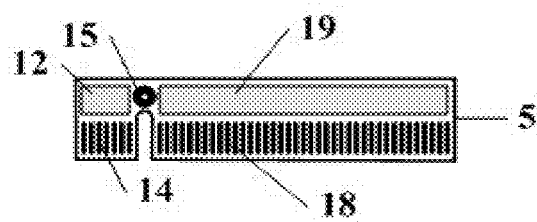

FIGS. 5A-5C show examples of said Adapter board 5 for different sizes of the motherboard female PCI Express connectors 7. The PCI Express interface can be one lane (×1), 2 lanes (×2), 4 lanes (×4), 8 lanes (×8), or 16 lanes (×16) wide. The PCI Express connector has different length depending on the numbers of supporting lanes. Each PCI Express connector is divided into 2 sections: a front section 14 that includes low speed control signals and power, and communication sections 13, 17, 18 that includes high-speed differential communication signals.

FIG. 5A shows the example of the Adapter board 5 having ×1 male edge PCI Express connector. The communication section 13 is very small and includes in this case only 3 differential signal pairs. FIG. 5B shows the example of the Adapter board 5 having ×8 male edge PCI Express connector. The communication section 17 in this case is longer and includes 14 additional differential signal pairs compared to ×1 connector. FIG. 5C shows the example of Adapter board 5 having ×16 male edge PCI Express connector. The communication section 18 in this case is longer than in ×8 PCI Express connector and includes 30 additional differential signal pairs compared to ×1 connector. In all said cases the front sections 14 are exactly the same mechanically and electrically.

Figure 6:
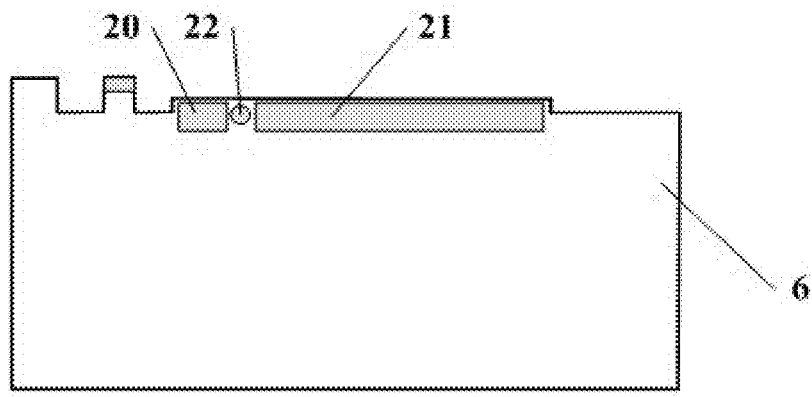
FIG. 6 shows an example of the Main board together with means for mechanical and electrical connection to the Adapter board.

The FIG. 5A shows an example of means for electrical and mechanical connection of the Adapter board 5 (×1 PCI Express connector) and the Main board 6 (FIG. 6) located on the Adapter board 5. Said means include two connectors 12, 11 and mounting hole 15. The size of the connector 12 and 11 is chosen based on the number of signals between Adapter board 5 and Main board 6 (FIG. 6). The front connector 12 is used for the connection low speed signals and power signals from front section of the PCI Express connector 14. The connector 11 is used for the connection of high speed signals from the communication section 13 of the PCI Express connector.

The FIG. 5B shows an example of means for electrical and mechanical connection of the Adapter board 5 (×8 PCI Express connector) and the Main board 6 (FIG. 6) located on the Adapter board 5. Said means include two connectors 12, 16 and the mounting hole 15. Connector 16 in this case has more pins compared to the similar connector 11 on FIG. 5A.

The FIG. 5C shows an example of means for electrical and mechanical connection of the Adapter board 5 (×16 PCI Express connector) and the Main board 6 (FIG. 6) located on the Adapter board 5. Said means include two connectors 12, 19 and mounting hole 15. Said connector 19 in this case includes all signals from the ×16 PCI express connector section 18. The connector 19 can be split into multiple smaller connectors (not shown).

The FIG. 6 shows the bottom side 45 of the Main board 6 where means for connection of Adapter board 5 (not shown) and Main board 6 are placed. These means include two connectors 20, 21 and a spacer 22.

The height of the spacer 22 and type of the connectors 20, 21, 12, 19, 16, 11 that are located on the Adapter board 5 and Main board 6 define the space between Adapter board 5 and Main board 6 and is equal to t±c, where t=4.33 mm and c is several times smaller than t. Where said value "c" is chosen based on the actual size of components and structural elements that are located on the Main board 6. This distance places Main board 6 in the middle of the space reserved for one-slot PCI Express add-in boards by PCI Express specification.

When the Main board 6 and the Adapter board 5 are assembled together the front connector 20 on the Main board 6 shown in FIG. 6 will mate to connector 12 on the Adapter board 5 (FIG. 5A-5C). The high speed signal connector 21 will mate to said high speed signal connector on the Adapter board that supports the same number of lanes as the Main board 6. For example, if Main board 6 supports 16 lanes, then any Adapter board can be connected to said Main board, and the connector 21 will mate with one of connectors 13, 17 or 18 (FIGS. 5A-5C). In case when said Main board supports one lane PCI Express interface then only Adapter board 5 (FIG. 5A) that has ×1 PCI Express connector can be connected to the Main board 6, and the connector 21 will mate only with connector 13 (FIG. 5A).

The spacer 22 can be soldered, glued or fix by screw on the bottom side of the Main board 6. In this case when the Main board 6 is assembled with the Adapter board 5 together they can be additionally (in addition to the mating connectors) mechanically fastened together by a screw that can be tighten via mounting hole 15 (FIGS. 5A-5C) to said spacer 22 (FIG. 6).

The location of the spacer 22 (FIG. 6) and the mounting hole 15 (FIGS. 5A-5C) is chosen in the place where are no signals on the Adapter board 5 (FIGS. 5A-5C) and PCBs of said Boards have a space for the hole. This area is located close to the PCB cut-out of said male edge PCI Express connector.

At least one of the mechanical connectors, such as a spacer, can be aligned with a cut-out on the male edge PCI Express connector. This spacer may be located on a line that passes approximately via the center line of the mechanical key cut-out on the PCI Express male edge connector of the Adapter Board 5. The mechanical connector can be fastened on the Adapter Board 5 and said Main Board 6 using a fastener such as glue, a screw, or a clamp.

Figure 7:
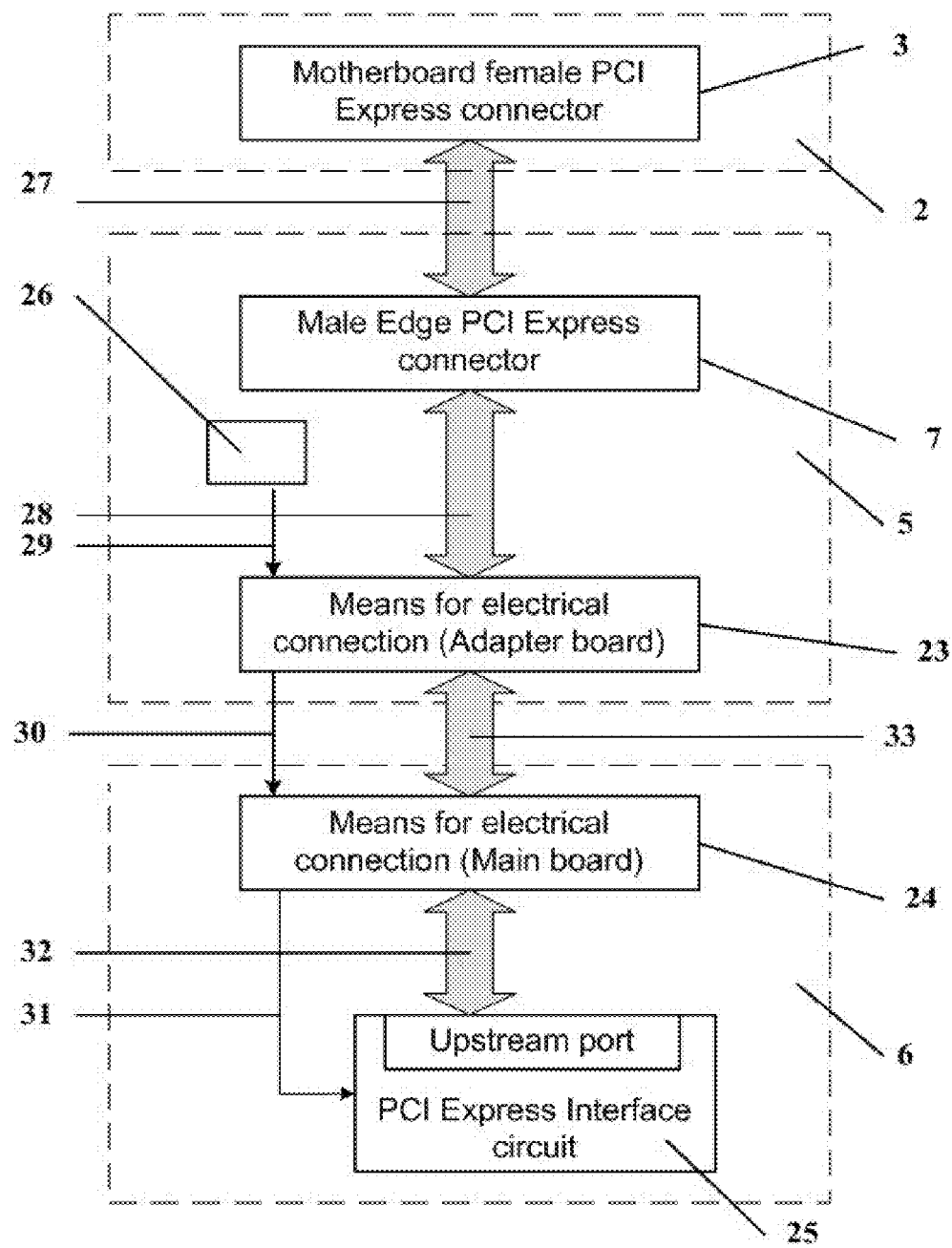
FIG. 7 shows a diagram of electrical signal connections between the Main board and the Adapter board.

FIG. 7 shows the diagram of an electrical connection between the Main board 6 and the Adapter board 5 and the Motherboard female PCI Express connector 3 located on the motherboard 2 (FIG. 1A). A male edge PCI Express connector 7 is located on the Adapter board 5 and is intended to be plugged in to the motherboard female PCI Express connector 3. A code generator 26 creates the code that defines the size of the male edge PCI Express connector 7 that is located on the Adapter board 5 and this code is defined during Adapter board 5 production. The Adapter board 5 has means for electrical and mechanical connection 23. These means 23 are intended for connection to the means for electrical and mechanical connection 24 located on the Main board 6 when both Adapter and Main boards assembled together. A PCI Express interface circuit 25 is located on the Main board 6. The PCI Express interface circuit 25 can be implemented for example as a PCI Express switch or a PCI Express bridge. The upstream PCI Express port of PCI Express circuit 25 connects to PCI Express root complex (not shown) located on the motherboard board 2 via buses 32, 33, 28, 27, means for electrical and mechanical connection 23, 24 and PCI Express connectors 7, 3.

The PCI Express upstream port of the PCI Express interface circuit can support 1 lane, 2 lane, 4 lane, 8 lane, or 16 lane connections. In some cases, the electrical signal connectors between the main board 6 and the adapter board 5 may include signal connectors for all supported PCI Express upstream port lanes. In other cases, the electrical signal connectors may include a reduced number of signal connectors for a reduced number of upstream port lanes.

In various examples, the male edge PCI Express connector of the Adapter Board 5 can support 1 lane, 2 lane, 4 lane, 8 lane, or 16 lane connections. The Adapter board 5 can also include an electrical circuit for generating code based on the number of PCI express lanes supported by the male edge PCI Express connector of that Adapter board 5. The code generating electrical circuit can be connected to the PCI Express interface circuit on the main board 6 via the electrical signal connectors. The code generating electrical circuit can configure the PCI Express interface circuit and the PCI Express upstream port on the main board 6 to operate in accordance with the number of lanes supported by the Adapter board 5. The code generating electrical circuit can configure the PCI Express interface circuit and the PCI Express upstream port to operate using a reduced number of lanes.

The code from the code generator 26 via signals 29, 30, 31 connects to the PCI Express interface circuit 25 and setup the PCI Express interface circuit 25 operation based on the lane number that the Adapter board 5 supports. This code allows changing operations of the PCI Express circuit 25, which includes the upstream port, in cases when the number of lanes that connect to the motherboard PCI Express root complex (not shown) is decreased by the Adapter board 5.

We claim:

1. A PCI express board assembly for mounting to a female PCI express connector provided on a motherboard, the female PCI express connector having a receiving portion defining a centerline extending in a longitudinal direction, and the motherboard defining a motherboard plane, the PCI express board assembly comprising:
a main board comprising a PCI express interface circuit configured to support communication over a plurality of main board PCI express lanes, the main board defining a main board plane extending along a longitudinal main board centerline;
an adapter board comprising a male PCI express connector, wherein the male PCI express connector is receivable in the receiving portion of the female PCI express connector to secure the adapter board to the motherboard, the adapter board defining an adapter board plane, and the adapter board comprising a code generation circuit that is configured to deactivate some of the main board PCI express lanes supported by the PCI express interface circuit while maintaining at least one main board PCI express lane activated; and
a connector section comprising a plurality of connectors attaching the main board to the adapter board; wherein the main board plane is parallel to the adapter board plane, and the main board plane and the adapter board plane are laterally offset from each other, the plurality of connectors comprising: (i) a plurality of signal connectors for electrically coupling the main board to the adapter board, and (ii) at least one mechanical connector;
wherein when the adapter board is secured to the motherboard with the male PCI express connector received in the female PCI express connector: (i) the adapter board plane is aligned with the centerline of the female PCI express connector and perpendicular to the motherboard plane; and (ii) the main board plane is offset from the receiving portion of the female PCI express connector in a lateral direction and the main board plane is perpendicular to the motherboard plane.

2. The assembly of claim 1, wherein the PCI express interface circuit comprises one of a PCI express switch and a PCI express bridge.

3. The assembly of claim 1, wherein the main board plane is offset from the centerline of the female PCI express connector in a lateral direction by about 5 mm-7 mm.

4. The assembly of claim 1, wherein:
the receiving portion has a lateral receiving portion width; and
the main board comprises a printed circuit board having a lateral thickness greater than the lateral receiving portion width.

5. The assembly of claim 1, wherein the main board has a thickness that is different from a thickness of the adapter board.

6. The assembly of claim 1, wherein:
the female PCI express connector has a top side upper surface that extends in the lateral direction from a first top side edge adjacent the receiving portion to a second top side edge over a first distance, the top side upper surface defining a maximum female connector height;
the main board plane is offset in the lateral direction from the receiving portion of the female PCI express connector over a second distance; and
the second distance is greater than the first distance.

7. The assembly of claim 1, further comprising a bracket mechanically coupled to the main board, the bracket extending in a direction parallel to the main board plane.

8. The assembly of claim 7, wherein the bracket has a bracket centerline extending in the direction parallel to the main board plane and the main board plane is aligned with the bracket centerline.

9. The assembly of claim 1, wherein the adapter board is detachably attached to the main board.

10. The assembly of claim 1, wherein:
the adapter board is configured to support communication over at least one adapter board PCI express lane that includes fewer PCI express lanes than the plurality of main board PCI express lanes.

11. The assembly of claim 10, wherein:
the code generation circuit is configured to define code to change operation of the main board to support communication over a reduced number of main board PCI express lanes corresponding to the at least one adapter board PCI express lane.

12. The assembly of claim 1, wherein when the adapter board is mounted to the female PCI express connector, a height of the main board in a direction perpendicular to the motherboard plane is greater than a height of the adapter board in the direction perpendicular to the motherboard plane.

13. The assembly of claim 1, further comprising a spacer positioned between the main board and the adapter board; wherein:
the male PCI express connector has a cut-out section; and
the spacer is aligned with the cut-out section.

14. The assembly of claim 1, wherein:
the female PCI express connector has a top side upper surface that extends in the lateral direction from a first top side edge adjacent the receiving portion to a second top side edge over a first distance;
the adapter board has an upper edge defining a maximum adapter board height; and
the connector section is positioned above the top side upper surface and extends between the top side upper surface and the maximum adapter board height.

15. The assembly of claim 1, wherein the main board has a top surface and a bottom surface, wherein the main board comprises a first element mounted on the top surface having a height greater than 6 mm and a second element mounted on the bottom surface having a height greater than 6 mm.

16. A PCI express board assembly for mounting to a female PCI express connector provided on a motherboard, the PCI express board assembly comprising:
a main board comprising a PCI express interface circuit configured to support communication over a plurality of main board PCI express lanes;
an adapter board configured to support communication over at least one adapter board PCI express lane, the adapter board comprising a code generation circuit and a male PCI express connector, wherein the male PCI express connector is securable to the female PCI express connector, and wherein the at least one adapter board PCI express lane includes fewer PCI express lanes than the plurality of main board PCI express lanes; and
a plurality of connectors attaching the main board to the adapter board, the plurality of connectors comprising: (i) a plurality of signal connectors for electrically coupling the main board to the adapter board, and (ii) at least one mechanical connector;
wherein the code generation circuit is configured to deactivate some of the main board PCI express lanes supported by the PCI express interface circuit while maintaining at least one main board PCI express lane activated to change operation of the main board to support communication over main board PCI express lanes corresponding to the at least one adapter board PCI express lane.

17. The PCI express board assembly of claim 16, wherein the adapter board is detachable from the main board.

18. The PCI express board assembly of claim 16, wherein the code defined by the code generation circuit is predefined during production.

19. A PCI express board assembly for mounting to a female PCI express connector provided in a PCI express reserved space on a motherboard, the motherboard defining a motherboard plane, and the female PCI express connector having a receiving portion extending in a longitudinal direction parallel to the motherboard plane, and the reserved space having a reserved space centerline extending in the longitudinal direction, the PCI express board assembly comprising:
a main board comprising a PCI express interface circuit configured to support communication over a plurality of main board PCI express lanes, the main board defining a main board plane extending along a longitudinal main board centerline;
an adapter board comprising a male PCI express connector that is receivable in the receiving portion and secureable to the female PCI express connector, the adapter board comprising a code generation circuit that is configured to deactivate some of the main board PCI express lanes supported by the PCI express interface circuit while maintaining at least one main board PCI express lane activated; and
a plurality of connectors for attaching the main board to the adapter board, the plurality of connectors comprising: (i) a plurality of signal connectors for electrically coupling the main board to the adapter board, and (ii) at least one mechanical connector;
wherein when the adapter board is secured to the female PCI express connector with the male PCI express connector received in the female PCI express connector, the main board plane is perpendicular to the motherboard plane and the main board plane is aligned with the reserved space centerline.

* * * * *